United States Patent
Chan et al.

(10) Patent No.: US 11,182,736 B2
(45) Date of Patent: Nov. 23, 2021

(54) SYSTEM AND METHOD FOR SMART INVENTORY CAPTURE

(71) Applicant: Wells Fargo Bank, N.A., San Francisco, CA (US)

(72) Inventors: Tracy Chan, San Francisco, CA (US); Haritha Devarajan, Dublin, CA (US); Ellen Fabini, San Francisco, CA (US); Jennifer Greene, Novato, CA (US); Darius A. Miranda, San Francisco, CA (US); Marria Wairmola Rhodriquez, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 333 days.

(21) Appl. No.: 15/868,845

(22) Filed: Jan. 11, 2018

(65) Prior Publication Data

US 2019/0057343 A1 Feb. 21, 2019

Related U.S. Application Data

(60) Provisional application No. 62/492,560, filed on May 1, 2017.

(51) Int. Cl.
*G06Q 10/08* (2012.01)
*G06Q 40/08* (2012.01)

(52) U.S. Cl.
CPC ........... *G06Q 10/087* (2013.01); *G06Q 40/08* (2013.01)

(58) Field of Classification Search
CPC ...... G06Q 10/087; G06Q 40/08; G06Q 40/04; G06Q 40/06
See application file for complete search history.

(56) References Cited

U.S. PATENT DOCUMENTS 7,607,577 B1 * 10/2009 Yu .................. G06Q 20/203 235/375
7,881,986 B1 * 2/2011 Pape ............... G06Q 10/087 705/28

(Continued)

FOREIGN PATENT DOCUMENTS

WO  WO-01/98945     12/2001
WO  WO-0237234 A2 * 5/2002 ............. G06Q 10/04

(Continued)

OTHER PUBLICATIONS

Tatarevic, Bozi: Tracking the Lot Time of Used Cars Can Save You Money, Sep. 3, 2015. TITAC, pp. 1-3 (Year: 2015).*

(Continued)

*Primary Examiner* — Bijendra K Shrestha
(74) *Attorney, Agent, or Firm* — Foley & Lardner LLP

(57) ABSTRACT

A smart inventory service provider system is provided. The system includes a network interface configured to communicate data over a network and a processing circuit. The processing circuit includes one or more processors coupled to non-transitory memory. The processing circuit is configured to receive inventory item data. Inventory item data is associated with an inventory item and is captured by a user computing device. The processing circuit is further configured to associate the inventory item data with a user account in a user inventory database, monitor an external computing system for a transaction offer related to the inventory item, and transmit the transaction offer to the user computing device.

17 Claims, 4 Drawing Sheets

(56) References Cited

U.S. PATENT DOCUMENTS

| | | | |
|---|---|---|---|
| 8,102,264 | B2 | 1/2012 | Rinkes et al. |
| 8,774,471 | B1 * | 7/2014 | Laaser ............... G06K 9/00912 382/115 |
| 9,280,793 | B2 | 3/2016 | English et al. |
| 9,286,323 | B2 | 3/2016 | Cardonha et al. |
| 9,418,371 | B2 * | 8/2016 | Hansen ............... G06Q 10/087 |
| 2004/0215484 | A1 * | 10/2004 | McKnight ........... G06Q 30/012 705/302 |
| 2006/0167779 | A1 * | 7/2006 | Turner ................. G06Q 40/04 705/35 |
| 2009/0210324 | A1 * | 8/2009 | Bhogal ................ G06Q 10/087 705/28 |
| 2010/0022221 | A1 | 1/2010 | Yi et al. |
| 2010/0076794 | A1 | 3/2010 | Seippel |
| 2011/0145093 | A1 * | 6/2011 | Paradise ............ G06Q 30/0613 705/26.41 |
| 2011/0161117 | A1 * | 6/2011 | Busque ............. G06Q 20/3278 705/4 |
| 2012/0037700 | A1 | 2/2012 | Walji et al. |
| 2012/0084119 | A1 * | 4/2012 | Vandehey .......... G06Q 30/0202 705/7.31 |
| 2012/0239581 | A1 * | 9/2012 | Mosher ............... G06Q 50/163 705/302 |
| 2014/0201088 | A1 * | 7/2014 | Pothuri ................ G06Q 30/012 705/302 |
| 2014/0257888 | A1 | 9/2014 | Yi et al. |
| 2015/0009013 | A1 | 1/2015 | Cartwright et al. |
| 2015/0228028 | A1 | 8/2015 | Friedman |
| 2016/0093000 | A1 | 3/2016 | Pevzner et al. |
| 2016/0104228 | A1 * | 4/2016 | Sundaresan ........ G06Q 30/0625 705/26.3 |
| 2017/0032310 | A1 * | 2/2017 | Mimnaugh .......... G06Q 10/087 |
| 2017/0255989 | A1 * | 9/2017 | Calio ................. G06Q 20/3224 |

FOREIGN PATENT DOCUMENTS

| | | | | |
|---|---|---|---|---|
| WO | WO-2012047240 | A1 * | 4/2012 | ........... G06Q 10/087 |
| WO | WO-2017066433 | A1 * | 4/2017 | .............. H04W 4/80 |

OTHER PUBLICATIONS

Robinhood: Smart Notifications, Feb. 4, 2016, pp. 1-9 (Year: 2016).*

Robinhood: Smart Notifications, Feb. 2016, pp. 1-9 (Year: 2016).*

Jensen, Eric: What is the Real Cost of Dead Inventory, Jun. 7, 2016, Industrial Distribution, pp. 1-8 (Year: 2016).*

Ufford, Lauren: Surplus Inventory: 6 Surefire Ways to Liquidate it to Improve Your Bottom Line, Nov. 9, 2016, pp. 1-10 (Year: 2016).*

Bahney, Anna, "The Best Home Inventory Apps", https://www.forbes.com/sites/annabahney/2015/04/30/the-best-home-inventory-apps/#16bd293e7ae1, Apr. 30, 2015.2 pages.

Eaton, Kit, "Sorting Out the Family Home, Laden with Possessions", http://www.nytimes.com/2013/03/14/technology/personaltech/apps-to-keep-an-inventory-of-items-in-your-home.html?,Mar. 13, 2013. 11 pages.

Harper, Elizabeth, "The Best Apps for Crating a Home Inventory for Insurance", http://www.techlicious.com/how-to/the-best-apps-for-creating-a-home-inventory/, Sep. 29, 2014. 10 pages.

Lawley, Deanna, "Top 10 Moving Apps to Make the Big Move Easier", http://blog.homefinder.com/2012/07/17/top-10-moving-apps-to-make-the-big-move-easier/, Jul. 17, 2012. 2 pages.

Liberty Mutual, "Home Gallery App", https://www.libertymutual.com/liberty-mutual-mobile/home-inventory-app, downloaded Oct. 11, 2016.5 pages.

Pontius, Nicole, "Top 30 Inventory Management, Control an Tracking Apps", http://www.camcode.com/asset-tags/inventory-management-apps/, Sep. 24, 2016. 53 pages.

Torrevillas, Cherry Mae, "The best iPhone apps for inventory", http://www.apppicker.com/applists/24921/the-best-iphone-apps-for-inventory, Jun. 21, 2015. 13 pages.

* cited by examiner

SYSTEM AND METHOD FOR SMART INVENTORY CAPTURE

CROSS-REFERENCE TO RELATED APPLICATION

This application claims priority to U.S. Provisional Patent Application No. 62/492,560 entitled "SYSTEM AND METHOD FOR SMART INVENTORY CAPTURE," filed May 1, 2017, and incorporated herein by reference in its entirety.

TECHNICAL FIELD

The present invention relates generally to systems and methods that allow a user to capture and manage inventory items in a smart inventory system.

BACKGROUND

Although users today commonly purchase goods via methods that result in an electronic receipt of the purchase, maintaining a centralized record of all of a user's purchased goods is difficult. For example, users wishing to purchase insurance for the contents of a home are often required to estimate the cost of each item of value and reach a total by summing the estimates. In addition, users in possession of items of limited useful lifespan (e.g., baby clothes and furniture, wedding supplies) must determine what they own and sort through the items to determine which have an estimated value high enough to offset the hassle of manually listing the items for sale and/or for donation. Further, tracking and maintaining warranties for various items can also be a tedious process which could result in the misplacement of warranties.

SUMMARY

One embodiment of the present disclosure relates to a smart inventory service provider system. The system includes a network interface configured to communicate data over a network and a processing circuit. The processing circuit includes one or more processors coupled to non-transitory memory. The processing circuit is configured to receive inventory item data. Inventory item data is associated with an inventory item and is captured by a user computing device. The processing circuit is further configured to associate the inventory item data with a user account in a user inventory database, monitor an external computing system for a transaction offer related to the inventory item, and transmit the transaction offer to the user computing device.

Another embodiment of the present disclosure relates to a computer-implemented method performed by a smart inventory service provider computing system. The method includes receiving inventory item data. The inventory item data is associated with an inventory item and is captured by a user computing device. The method further includes associating the inventory item data with a user account in a user inventory database, monitoring an external computing system for a transaction offer related to the inventory item, and transmitting the transaction offer to the user computing device.

Another embodiment of the present disclosure relates to a computer-implemented method performed by a smart inventory client application of a user computing system. The method includes capturing inventory item data that is associated with an inventory item and transmitting the inventory item data to a smart inventory service provider computing system. The method further includes receiving a transaction offer related to the inventory item from the smart inventory service provider computing system and transmitting a transaction offer acceptance to the smart inventory service provider computing system.

These and other features, together with the organization and manner of operation thereof, will become apparent from the following detailed description when taken in conjunction with the accompanying drawings.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Referring generally to the figures, various systems, methods, and apparatuses related to a smart inventory system structured to assist users in creating and managing an inventory of items are described.

Beneficially, such systems promote optimized inventory identification by operating in an ongoing, real-time, and proactive fashion. Inventory information is transmitted in a selective manner based on detection of such inventory items in a particular location (e.g., user's home, business) such that marketplace, insurance, warranty, and other related information is kept up-to-date in real-time with only relevant information captured. Thus, users will become less inundated with irrelevant information while using the system. In addition, inventory information may be captured in a more time-relevant manner for a user such that a user is notified of changing values and changing inventory numbers as the changes are occurring. As such, the systems, methods, and apparatuses of the present disclosure may also reduce the memory and bandwidth requirements in tracking inventory information. Because of the aforementioned real-time reactionary behavior, the systems may selectively provide alerts and/or update inventory information instead of providing constant and numerous irrelevant alerts, which in turn may reduce data transfer requirements. Additionally, the systems, method, and apparatuses of the present disclosure may be configured to be operated at least partly on a mobile device application, thereby requiring less storage for identification of inventory information and updates. Thus, the need for large amounts of data storage on servers at an inventory computing system may be reduced.

Figure 1:
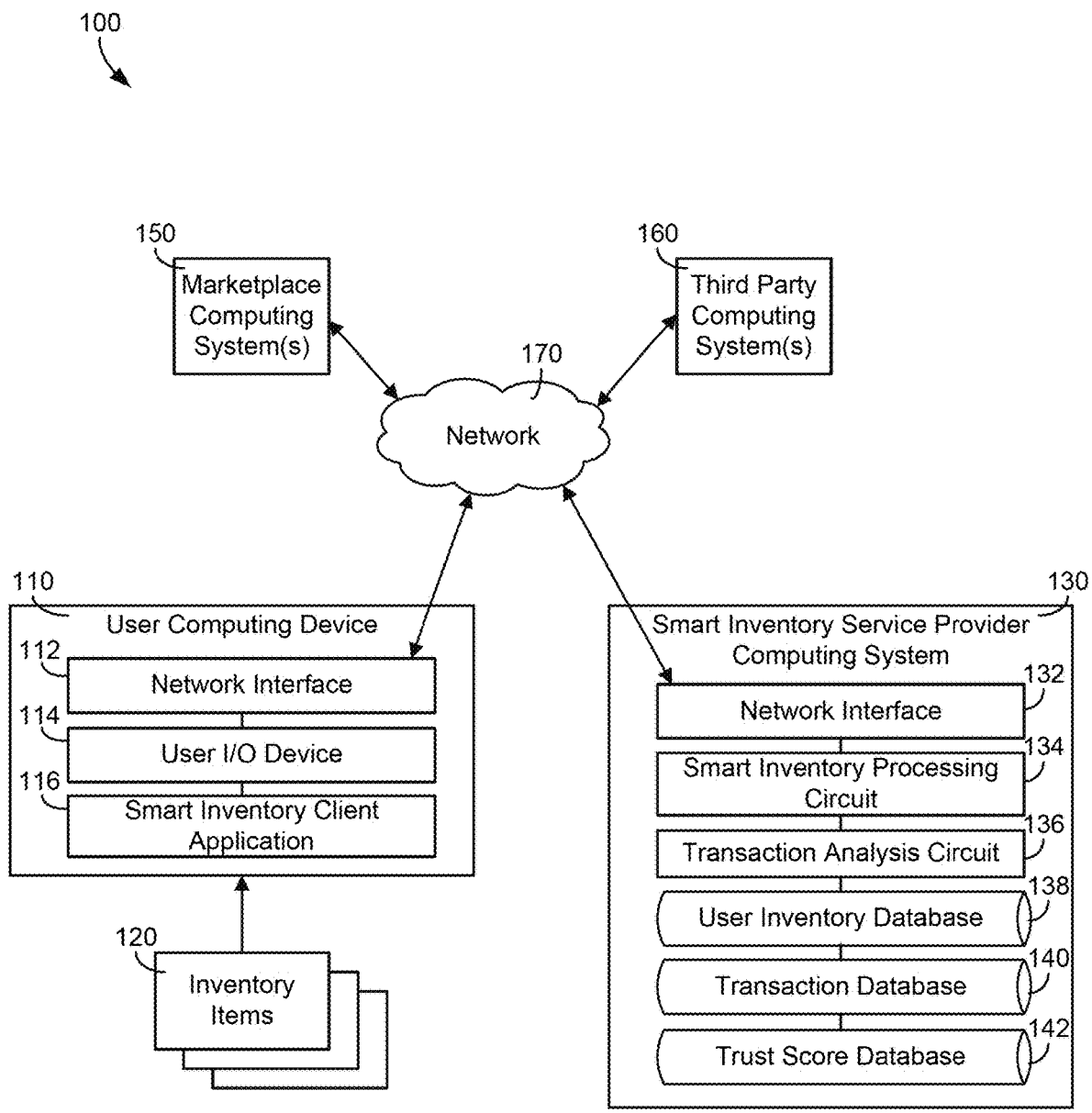
FIG. 1 is a schematic diagram of a computer-implemented smart inventory capture and management system, according to an example embodiment.

Referring now to FIG. 1, a block diagram of a smart inventory system 100 is shown, according to an example embodiment. The smart inventory system 100 includes a mobile device 110, inventory items 120, a smart inventory service provider computing system 130, a marketplace computing system 150, and a third party computing system 160. Various components of the smart inventory system 100 communicate with one another over a network 170. The network 170 is a data exchange medium, which may include wireless networks (e.g., cellular networks, Bluetooth®, WiFi, Zigbee®), wired networks (e.g., Ethernet, DSL, cable, fiber-based), or a combination thereof. In some arrangements, the network 170 includes the internet.

The user computing device 110 is a computing device associated with a user and configured to communicate with the smart inventory service provider computing system 130 via the network 170 to exchange information. The user may be any entity capable of owning or interacting with inventory items 120. The user may include both individuals and organizations. Inventory items 120 may include any physical article. In various arrangements, the inventory items 120 may include appliances, furniture, clothing, home goods, electronic devices, physical media (e.g., books, LPs, Blu-rays), sporting equipment, musical instruments, tools, toys and the like. If the user is an organization (e.g., a business), the inventory items 120 may include any merchandise capable of being included in an inventory (e.g., stock list). In various arrangements, the user or entity associated with the user holds or is otherwise associated with an account at the smart inventory service provider computing system 130.

The user computing device 110 includes any type of computing device that may be used to communicate information both to and from the smart inventory service provider computing system 130. In some arrangements, the user utilizes the user computing device 110 to engage in inventory creation and management transactions. When referred to herein, "transactions" can include any means of changing the ownership of an inventory item (e.g., selling the item, trading the item, donating the item) or changing the status of the inventory item (e.g., purchasing insurance for the item, upgrading the item, transporting the item). The user computing device 110 includes any wearable or non-wearable device. Wearable devices refer to any type of device that an individual wears including, but not limited to, a watch (e.g., smart watch), glasses (e.g., eye glasses, sunglasses, smart glasses), bracelet (e.g., a smart bracelet), a virtual reality (VR) or augmented reality (AR) headset, etc. The user computing device 110 also includes any type of mobile device including, but not limited to, a phone (e.g., smart phone, etc.), tablet, personal digital assistant, and/or computing devices (e.g., desktop computer, laptop computer, personal digital assistant).

In the example embodiment shown, the user computing device 110 includes a network interface 112 enabling the user computing device 110 to exchange information over the network 170, a smart inventory client application 116, and a user input/output (I/O) device 114. The user I/O device 114 includes hardware and associated logics configured to enable the user computing device 110 to exchange information with the user, the smart inventory service provider computing system 130, the marketplace computing system 150, and the third party computing system 160, as will be described in greater detail below. An input device or component of the user I/O device 114 allows the user to provide information to the user computing device 110, and may include, for example, a mechanical keyboard, a touchscreen, a microphone, a camera, a fingerprint scanner, any user input device engageable with the user computing device 110 via a universal serial bus (USB) cable, serial cable, Ethernet cable, and so on. An output device or component of the user I/O device 114 allows the user to receive information from the user computing device 110, and may include, for example, a digital display, a speaker, illuminating icons, light emitting diodes (LEDs) and the like.

The smart inventory client application 116 is structured to assist the user in smart inventory transactions. In this regard, the smart inventory client application 116 is communicably coupled to the smart inventory service provider computing system 130, the marketplace computing system 150, and the third party computing system 160. In some embodiments, the smart inventory client application 116 is a separate software application implemented on the user computing device 110. The smart inventory client application 116 may be downloaded by the user computing device 110 prior to its usage, hard coded into the memory of the user computing device 110, or accessible as a web-based interface application such that the user accesses the smart inventory client application 116 via a web browsing application. In this latter instance, the smart inventory client application 116 may be supported by a separate computing system including one or more servers, processors, network interface circuits, etc., that transmit applications for use to the user computing device 110. In certain embodiments, the smart inventory client application 116 includes an application programming interface (API) and/or a software development kit (SDK) that facilitates the integration of other applications (e.g., a mobile banking application or a mobile wallet application). Irrespective of the form that the smart inventory client application 116 takes, the smart inventory client application 116 is structured to provide displays to the user computing device 110 that assist the user in the management of the inventory items 120. An example of a client application user interface is described in further detail below with reference to FIG. 3.

Still referring to FIG. 1, the smart inventory service provider computing system 130 is a computing system associated with a smart inventory service provider. In various arrangements, the smart inventory service provider computing system 130 is associated with a financial institution, a software company, a consortium, or any other organization that manages inventory items. The smart inventory service provider computing system 130 includes a service provider network interface 132 that enables the smart inventory service provider computing system 130 to communicate data over the network 170 and between a smart inventory processing circuit 134, a transaction analysis circuit 136, a user inventory database 138, a transaction database 140, and a trust score database 142.

The smart inventory processing circuit 134 consists of one or more processors coupled to memory. Each processor may be implemented as one or more application specific integrated circuits (ASICs), field programmable gate arrays (FPGAs), a group of processing components, or other suitable electronic processing components. The memory may be one or more devices (e.g., RAM, ROM, Flash memory, hard disk storage) for storing data and/or computer code for completing and/or facilitating the various processes described herein. The memory may be or include non-transient volatile memory, non-volatile memory, and non-transitory computer storage media. The memory may include database components, object code components, script components, or any other type of information structure for supporting the various activities and information structures described herein. The memory is communicably coupled to the processor and include computer code or instructions for executing one or more processes described herein.

In various arrangements, the smart inventory processing circuit 134 is configured to receive data related to the inventory items 120 and perform valuation functions related to the inventory items 120. In some arrangements, the smart inventory processing circuit 134 connects to an external computing system (e.g., the marketplace computing system 150, the third party computing system 160) via the network 170 to gather additional information required to assign market values to the inventory items 120. Knowing the value of one or more inventory items 120 may prompt a user to retain or dispose of the inventory items 120. For example, if a user knows that a particular inventory item is valuable, but the user does not wish to keep the item, the user may donate the item to a charity. Since the value of the item is known and accessible via the smart inventory service provider computing system 130, the user may easily deduct the item's value when preparing income taxes.

The smart inventory processing circuit 134 is further configured to associate and store inventory item data in a user inventory database 138. The user inventory database 138 is a storage device structured to retrievably store user information relating to the various operations discussed herein, and may include non-transient data storage mediums (e.g., local disc or flash-based hard drives, local network servers, and the like) or remote data storage facilities (e.g., cloud servers). The user inventory database 138 includes personal user information (e.g., names, addresses, phone numbers, and so on), identification information (e.g., driver's license numbers, standard biometric data, and so on), and user financial information (e.g., token information, account numbers, account balances, available credit, credit history, transaction histories, and so on). In various arrangements, the user information stored in the user inventory database 140 may be organized according to a user account number or other identifier.

In some arrangements, the inventory item data stored in the user inventory database 138 is organized according to the physical locations of the inventory items 120. For example, a user may wish to store some inventory items in the user's home and other inventory items in a storage unit or some other non-residential location. By grouping the inventory items 120 according to each item's location, a user is able to easily locate a desired item (e.g., a user can quickly determine that infrequently used ski equipment is in the user's storage unit, without time-consuming searching of the user's basement or garage). In some arrangements, the user inventory database 138 interfaces with other computing systems (e.g., a marketplace computing system 150 or a third party computing system 160, described in further detail below) to estimate a total value of inventory items stored at each location. For example, the smart inventory service provider computing system 130 may alert a user if the total value of inventory items stored remotely in a storage unit is significantly less than the cost of renting the storage unit itself.

The transaction analysis circuit 138 is configured to monitor external computing systems (e.g., the marketplace computing system 150, the third party computing system 160) for transaction offers, receive responses to transaction offers, and store information related to transactions in the transaction database 140. The transaction analysis circuit 136 consists of one or more processors coupled to memory. Each processor may be implemented as one or more application specific integrated circuits (ASICs), field programmable gate arrays (FPGAs), a group of processing components, or other suitable electronic processing components. The memory may be one or more devices (e.g., RAM, ROM, Flash memory, hard disk storage) for storing data and/or computer code for completing and/or facilitating the various processes described herein. The memory may be or include non-transient volatile memory, non-volatile memory, and non-transitory computer storage media. The memory may include database components, object code components, script components, or any other type of information structure for supporting the various activities and information structures described herein. The memory is communicably coupled to the processor and include computer code or instructions for executing one or more processes described herein.

In some arrangements, the transaction analysis circuit 138 is located within or is indivisible from the smart inventory processing circuit 134. The transaction analysis circuit 138 is configured to monitor external computing systems (e.g., the marketplace computing system 150, the third party computing system 160) for transaction offers, receive responses to transaction offers, and store information related to transactions in the transaction database 140. In some arrangements, transaction offers include, but are not limited to, offers to sell, trade or donate the inventory item 120, offers to purchase insurance for the inventory item 120, and offers to upgrade the inventory item 120.

The transaction database 140 is a storage device structured to retrievably store information pertaining to inventory item transactions of various users, and may include non-transient data storage mediums (e.g., local disc or flash-based hard drives, local network servers, and the like) or remote data storage facilities (e.g., cloud servers). The transaction database 140 may be organized according to certain transaction characteristics. For example, each entry in the transaction database may include information describing various aspects of a transaction such as the inventory item, the origin of the transaction offer (e.g., the marketplace computing system 150, the third party computing system 160), the value of the transaction, and a category of the transaction.

In some arrangements, a business utilizes the transaction database 140 to store business transaction data relating to inventory item data that is stored in the user inventory database 138. Unlike a consumer user, a business user of the smart inventory system 100 may possess inventories of hundreds or thousands of identical inventory items 120. Employees of the business capture the inventory items 120 using a variety of methods (e.g., taking a picture of all of the inventory items stored in a warehouse, taking a picture of a single inventory item and manually inputting the total number of the item, scanning a bar code on a pallet of items). Once stored in the user inventory database 138, the transaction database 140 tracks the increases and decreases of the inventory items 120 due to sales and/or replenishment of the items. In some arrangements, the transaction analysis circuit 136 analyzes the stock and notifies the user if the stock exceeds or falls below certain thresholds. For example, if the amount of a certain inventory item 120 is steadily increasing due to replenishment of stock without corresponding decreases due to sales, the transaction analysis circuit 136 may transmit a notification to the user computing device 110 suggesting that resupply of the inventory item 120 be slowed or ceased.

The marketplace computing system 150 is a computing system associated with a marketplace for inventory items. The marketplace is an electronic means for users to buy, sell, or trade their inventory items with other users. In various arrangements, users of the marketplace may include a "trust" score that indicates the relative security of completing a transaction with the user. For example, a high trust score may indicate that a marketplace user is likely to complete a transaction involving an inventory item in a satisfactory manner. Conversely, a low trust score may indicate that the marketplace user is likely to complete a transaction involving an inventory item in a fraudulent or unsatisfactory manner. If a marketplace user's trust score falls below a certain threshold, the user's account may be temporarily or permanently deactivated on the marketplace. The trust score is based on a variety of factors, including biometric identifying data (e.g., fingerprint data, facial recognition data, voiceprint data, typing speed data), location data (e.g., location of a mobile device in relation to known Wi-Fi networks and Bluetooth devices), social media scores, credit scores, transaction feedback from other marketplace users, and seller ratings.

Each marketplace may also include a trust score. The marketplace trust score indicates the relative security of completing a transaction on the marketplace, and is based on a variety of factors, including, but not limited to, number of marketplace users, average trust score of marketplace user, number of transactions completed, and average value of transaction completed. The marketplace trust score is retrievably stored in a trust score database 142 maintained by the smart inventory service provider computing system 130. The trust score is stored upon the first interaction between a particular marketplace and the smart inventory service provider and can be updated periodically based on the interaction between the smart inventory service provider computing system 130 and the marketplace computing system 150.

The third party computing system 160 is a computing system associated with any third party organization or entity that conducts non-marketplace transactions with the user regarding the inventory items. In various arrangements, the third party computing system 160 may include, but is not limited to, a computing system maintained by a charity accepting donations of inventory items, an insurance company selling an insurance policy to cover the inventory items, a manufacturer offering a warranty for the inventory items, a recycling company offering to recycle the items, or a moving company offering to transport the items. Similar to the users of the marketplace computing system 150, in some arrangements, the entities associated with the third party computing system 160 include a trust score.

In various arrangements, the third party computing system 160 is a computing system owned or managed by the user. As one example, consumers are increasingly seeking to optimize their living spaces, as evidenced by the popularity of both "smart home" monitoring and control systems (e.g., smart thermostats, smart security systems, smart lighting systems) and minimalist "tiny homes." A third party computing system 160 (e.g., smart home computing system) may be utilized to monitor the usage of an inventory item stored in the user inventory database 138. As used herein, "usage" of an inventory item 120 may refer to the frequency that a user interacts with the inventory item (e.g., touching the item, moving the item) or the frequency that the inventory item 120 is powered on (if applicable).

If the smart inventory service provider computing system 130 determines that the inventory item 120 is not in regular use according to data supplied by the third party computing system 160, the smart inventory service provider computing system 130 may suggest that the user relocate the inventory item 120 (e.g., by transmitting a message to be displayed on the user computing device 110 suggesting the user move the inventory item to a storage location or other remote location). Alternatively, the smart inventory service provider computing system 130 may transmit a message to the marketplace computing system 150 and/or the third party computing system 160 to solicit transaction offers to sell, recycle, or donate the inventory item. Once the smart inventory service provider computing system 130 receives one or more transaction offers, it transmits a message to display the offers on the user computing device 110. In still further arrangements, the smart inventory service provider computing system 130 transmits a message to the marketplace computing system 150 and/or a third party computing system 160 to solicit reviews, tips, or instructions for the inventory item 120. For example, if the underutilized inventory item 120 is a kitchen appliance, the smart inventory service provider system 130 may request recipes that require use of the kitchen appliance from the marketplace computing system 150 and/or a third party computing system 160. Once received, the smart inventory service provider computing system 130 may transmit the recipes to be displayed on the user computing device 110.

In some arrangements, the third party computing system 160 is a computer system configured to aid a user in designing and furnishing a home. The system may utilize VR or AR techniques to permit a user to view a room (e.g., via a smart phone or headset device) and selectively add the user's inventory items 120. For example, by retrieving data stored in the user inventory database 138, a user is able to visualize what a piece of furniture would look like in a room before the furniture is physically moved into the room. In some arrangements, the third party computing system 160 utilizes data stored in the user inventory database 138 to suggest other furnishings or decorating ideas based on the inventory items 120 the user already owns.

Figure 2:
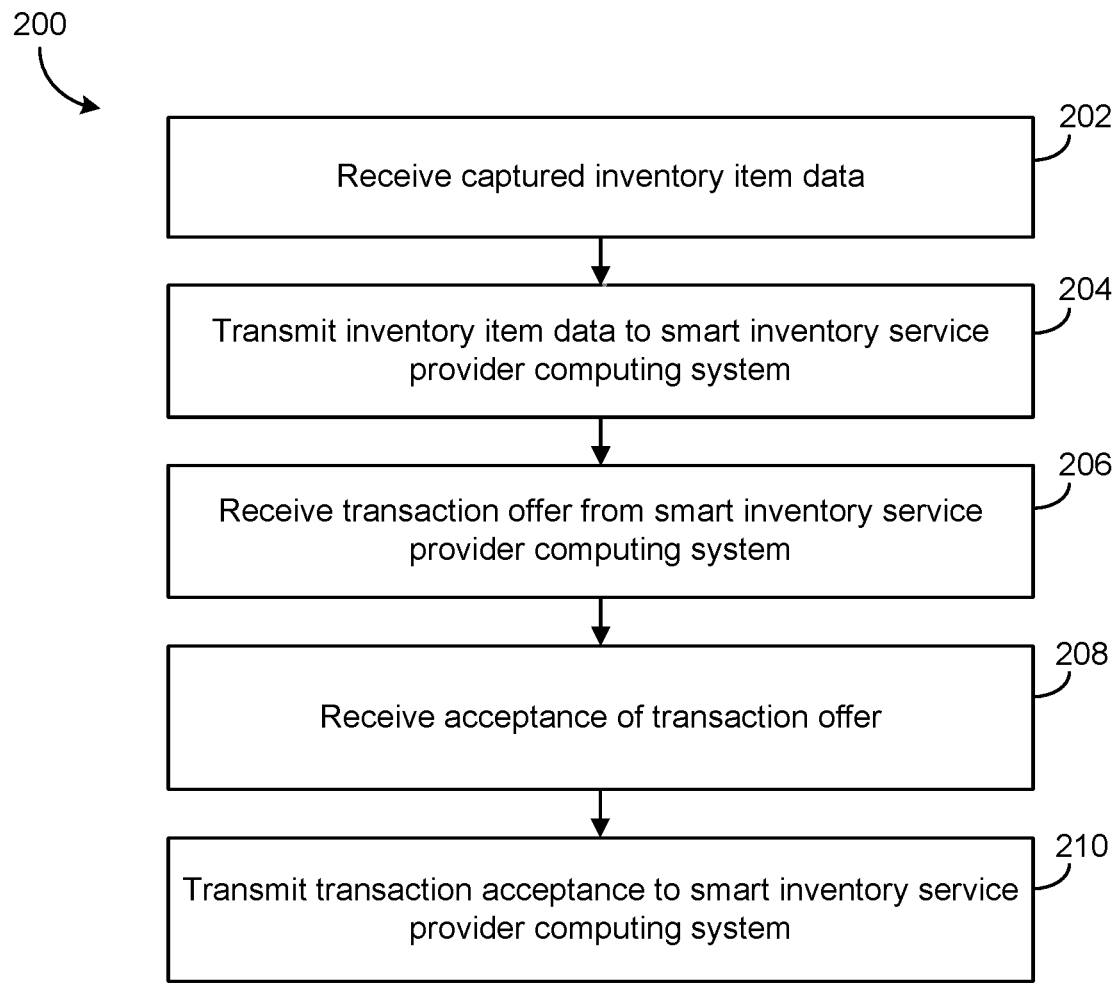
FIG. 2 is a schematic diagram of a process for capturing and managing a smart inventory of items using the system shown in FIG. 1, according to an example embodiment.

Turning now to FIG. 2, a flow diagram of a method 200 for capturing and managing a smart inventory of items is shown, according to an example embodiment. In some arrangements, the method 200 is performed using the smart inventory system 100 shown in FIG. 1. In particular, the method 200 may be at least partially performed using the smart inventory client application 116 of the user computing device 110. Captured data related to one or more inventory items 120 is received at 202. In some arrangements, the inventory item data is received by the smart inventory client application 116. For example, the user may use a mobile phone to take a picture of a recently purchased kitchen appliance. In various arrangements, step 202 may include capturing inventory item data in the form of an item picture, an item manufacturer, an item color, an item size, an item category, and an item serial number. For example, a user may take a picture of an article of clothing and manually enter certain descriptors related to the clothing (e.g., size, manufacturer). In some arrangements, the user computing device 110 captures data related to the inventory items 120 via an augmented reality (AR) process. For example, a user wearing an AR headset may be required to simply look at the inventory items 120 in order to capture the inventory items 120 that the user wishes to upload to the user's inventory.

In some arrangements, the inventory item data is stored by the smart inventory client application 116. Inventory item data is then transmitted to the smart inventory service provider computing system 130 at 204. Once the inventory item data is transmitted by the smart inventory client application 116 of the user computing device 110, the smart inventory service provider computing system 130 processes the inventory item data and communicates with external computing systems regarding transaction offers related to the inventory items 120. Further details are described below with reference to FIG. 3. A transaction offer is received at 206. In some arrangements, the transaction offer is received at the smart inventory client application 116 from the smart inventory service provider computing system 130. In various arrangements, the transaction offer may include, but is not limited to, an offer to sell, trade, donate, purchase a warranty, or purchase insurance for one or more inventory items 120.

The transaction offer is accepted at 208. In some arrangements, the user accepts the transaction offer within the smart inventory client application 116 (e.g., by clicking a link or button within the smart inventory client application user interface). Alternatively, the user may deny or dismiss an offer the user does not wish to accept. In some arrangements, the smart inventory client application 116 includes user configurable settings related to transaction offers. For example, a user may select a setting that notifies the user whenever the value of an inventory item 120 increases or decreases by a certain dollar amount or percentage (e.g., if the inventory item 120 is a piece of celebrity memorabilia, and the price of the memorabilia on the marketplace suddenly skyrockets due to the death of the celebrity, the user may wish to receive a notification from the smart inventory service provider computing system 130). If the user accepts the transaction offer, a message indicating the acceptance is transmitted at 210. In some arrangements, the message is transmitted by the smart inventory client application 116 to the smart inventory service provider computing system 130.

Figure 3:
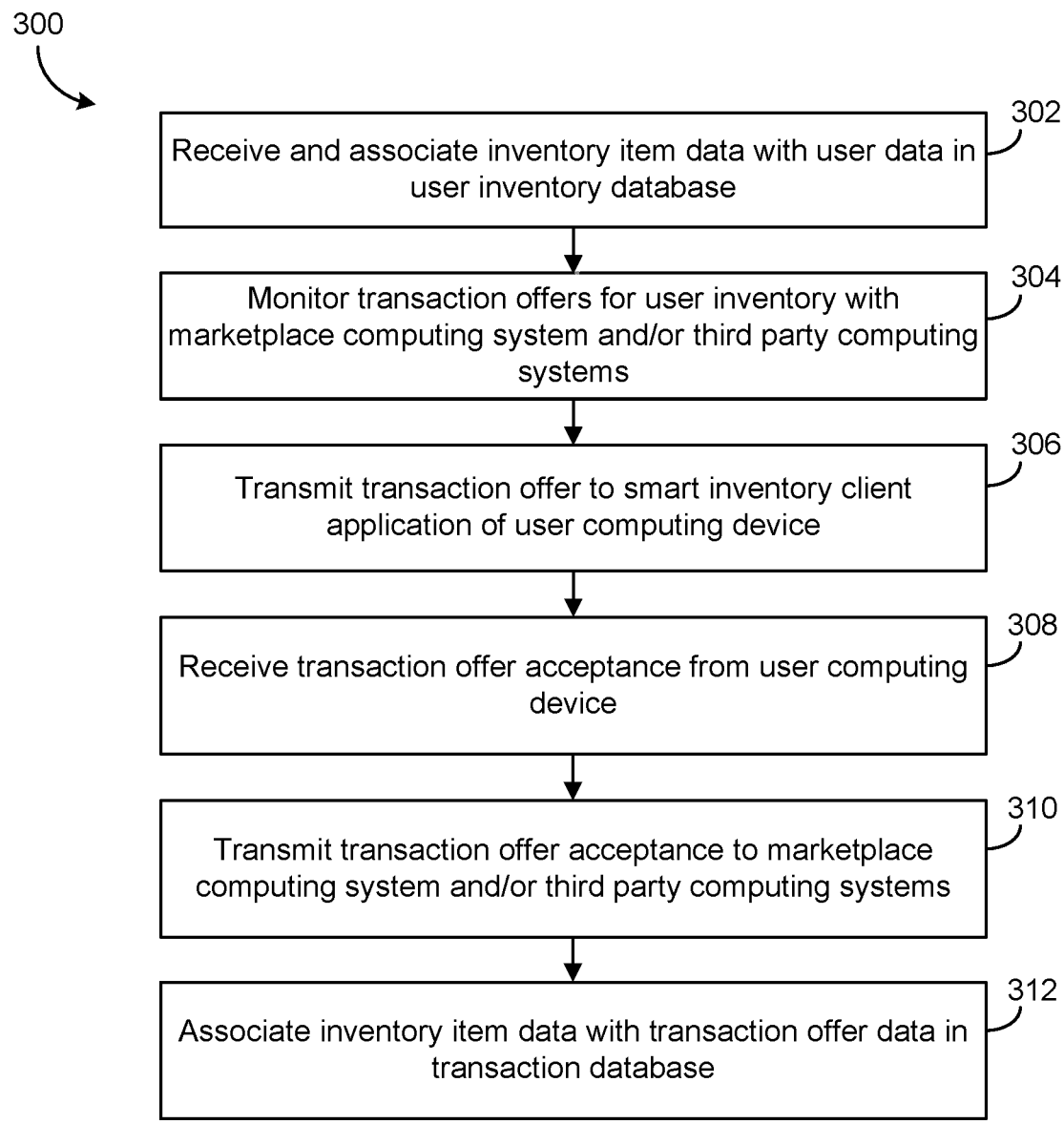
FIG. 3 is another schematic diagram of a process for capturing and managing a smart inventory of items using the system shown in FIG. 1, according to an example embodiment.

Turning now to FIG. 3, a flow diagram of a method 300 for managing a smart inventory of items is shown, according to an example embodiment. In some arrangements, the method 300 is performed using the smart inventory system 100 shown in FIG. 1. In particular, the method 300 may be at least partially performed using the smart inventory processing circuit 134 and the transaction analysis circuit 136 of the smart inventory service provider computing system 130. Inventory item data is received and associated with user account information at 302. In some arrangements, the inventory item data is received and associated by the smart inventory processing circuit 134 of the smart inventory service provider computing system 130. In various arrangements, this step includes associating the inventory item data with an electronic receipt stored in the user inventory database 138. This step enables a user to easily access information related to a purchase. For example, a user viewing a past receipt is able to view a picture of the purchased item and other descriptive information.

External computing systems (e.g., marketplace computing system 150, third party computing system 160) are monitored for transaction offers at 304. In some arrangements, monitoring of external computing systems is performed by the transaction analysis circuit 136 of the smart inventory service provider computing system 130. Transaction offers may take a variety of forms. For example, if the transaction offer originates from the marketplace computing system 150, the transaction offer may be an opportunity to sell or trade the inventory item 120. Conversely, if the inventory item 120 is an article that is often purchased in multiples (e.g., a plate from a matched china set) or with added accessories (e.g., a kitchen stand mixer), the transaction offer may be an opportunity to buy identical or related items to the inventory item 120.

If the transaction offer originates from a third party computing system 160, the offer may include an opportunity to donate, purchase insurance, or purchase or extend a warranty for the inventory item 120. For example, if the third party computing system 160 is an insurance company, the transaction offer may include a quote based on the estimated value of the inventory item 120. In some arrangements, the value of the inventory item 120 is estimated by the smart inventory processing circuit 134 based on the value of similar items sold via the marketplace computing system 150. As another example, third party computing system 160 may be a moving company the user is considering hiring to transport the inventory items 120. Based on certain inventory item data (e.g., the number of large and/or heavy items the user owns), the moving company may offer a quote for the moving job or an estimate for the packing materials required. Once the user has accepted an offer from the moving company, the smart inventory service provider 130 may transfer the inventory item data stored in the user inventory database 138 to the moving company computing system such that movers can access information about the inventory items 120 (e.g., coordinates of items, designated fragile items) via mobile computing devices to facilitate the moving process.

A message containing the transaction offer is transmitted at 306. In some arrangements, the message is transmitted by the smart inventory service provider computing system 130 to the smart inventory client application 116 of the user computing device 110. The smart inventory service provider computing system 130 then waits for the user to respond to the transaction offer. If the user accepts the offer (e.g., as described above at 208 with reference to FIG. 2), a message indicating the acceptance is received at 308. In some arrangements, the message indicating the acceptance is received by the smart inventory service provider computing system 130 from the smart inventory client application 116. A message indicating the transaction offer acceptance is transmitted at 310. In some arrangements, the message indicating the transaction offer acceptance is transmitted by the smart inventory service provider computing system 130. In various arrangements, the message is transmitted to marketplace computing system 150 and/or third party computing system 160 depending on the origin of the transaction offer. Inventory item data is associated with transaction offer data in a transaction database at 312. In some arrangements, the transaction analysis circuit 136 of the smart inventory service provider computing system 130 stores information related to the transaction and the associated inventory item(s) 120 in the transaction database 140. By storing transaction information in the transaction database 140, information that is otherwise diffuse is easily accessible from a central location. For example, a user preparing to file taxes is able to access a record of the user's donations to charity, including the estimated values of the items.

Figure 4:
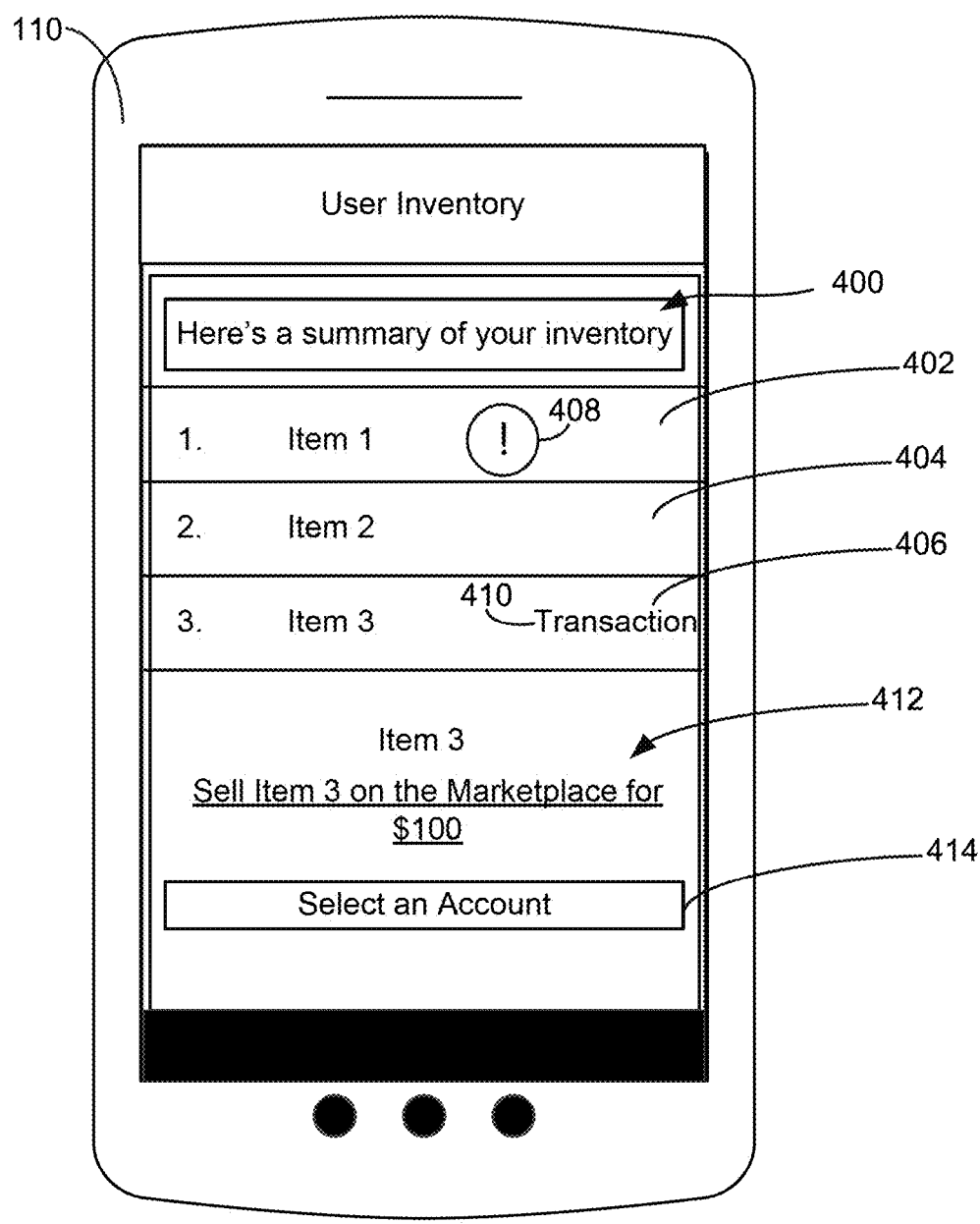
FIG. 4 is a schematic diagram of a smart inventory client application user interface, according to an example embodiment.

Referring now to FIG. 4, a user interface 400 is shown, according to an example embodiment. While the interface 400 is shown to be presented to the user via the user computing device 110 (e.g., a mobile device, a tablet), it should be understood that a similar interface may also be accessible to a user as a cloud service via any suitable internet browser. The interface 400 may be presented to the user during the smart inventory capture and management process described in methods 200 and 300 above. In the example shown, the interface 400 includes a first inventory item entry 402, a second inventory item entry 404, and a third inventory item entry 406. Each of the inventory item entries 402-406 may describe a separate inventory item 120 that was processed by smart inventory service provider computing system 130 in accordance with the methods described herein.

The second inventory item includes a notification 408. In various embodiments, the notification 408 may indicate to the user that the inventory item requires attention or action (e.g., renewal of a warranty, payment of an insurance premium). Similarly, the third inventory item entry 406 includes a transaction indication 410 notifying the user that the corresponding inventory item 120 has a pending transaction offer. In some arrangements, transaction indication 410 comprises a hyperlink and clicking on the hyperlink opens entry-specific window 412.

Entry-specific window 412 includes information for the user related to the transaction offer. As shown, this information may include the value of the transaction (i.e., $100) and the origin of the transaction offer (i.e., the marketplace computing system 150). In various arrangements, entry-specific window 412 includes a button or hyperlink to accept the transaction offer, as described above at 208 with reference to FIG. 2. The entry-specific window 412 further includes an account selection button 414. Upon the user selecting the account selection button 414, the user may be brought to an additional interface enabling the user to select an account the user wishes to associate with the transaction. For example, if the user is selling an inventory item 120 via the marketplace computing system, the user may select a mobile wallet account the user wishes to be credited by the transaction. Alternatively, if the user is purchasing insurance for an inventory item 120, the user may select an existing account the user maintains with the insurance company.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U. S. C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A smart inventory service provider system, comprising: a network interface configured to communicate data over a network; and a processing circuit comprising one or more processors coupled to non-transitory memory, wherein the processing circuit is configured to:
   receive inventory item data, wherein the inventory item data is associated with an inventory item and captured by a user mobile device;
   associate the inventory item data with a user account in a user inventory database;
associate the inventory item with a physical storage location of the inventory item;
   monitor a frequency of usage of the inventory item;
   transmit a message to the user mobile device based on the frequency of usage of the inventory item;
   monitor an external computing system for a first transaction offer related to the inventory item;
   upon receiving the first transaction offer from the external computing system, transmit the first transaction offer to the user mobile device;
   receive a selection of a value change threshold amount associated with the first transaction offer for the inventory item from the user mobile device;
   monitor the external computing system to estimate a real-time value of the inventory item;
   determine that the estimated real-time value of the inventory item has changed by a value change amount that exceeds the value change threshold amount; and
   upon determining that the estimated real-time value of the inventory item has changed by the value change amount that exceeds the value change threshold amount, transmit a second transaction offer to the user mobile device,
wherein the second transaction offer is at least one of an offer to sell the inventory item, an offer to trade the inventory item, and an offer to donate the inventory item.

2. The smart inventory service provider system of claim 1, wherein the inventory item data is at least one of an item picture, an item manufacturer, an item color, an item size, an item category, and an item serial number.

3. The smart inventory service provider system of claim 1, wherein the inventory item is at least one of an appliances, a piece of furniture, an item of clothing, an electronic device, a book, a CD, a DVD, a Blu-Ray disc, a piece of sporting equipment, a musical instrument, a tool, and a toy.

4. The smart inventory service provider system of claim 1, wherein the external computing system is at least one of a marketplace computing system, a charity computing system, an item manufacturer computing system, and an insurance provider computing system.

5. The smart inventory service provider system of claim 1, wherein the processing circuit is further configured to associate the inventory item data with a receipt stored in the user account.

6. The smart inventory service provider system of claim 1, wherein the user mobile device is a mobile phone.

7. The smart inventory service provider system of claim 1, wherein the processing circuit is further configured to:
   receive a transaction acceptance from the user mobile device; and
   associate the second transaction offer with the inventory item data in a transaction database.

8. A computer-implemented method comprising:
   receiving, by a smart inventory service provider computing system, inventory item data, wherein the inventory item data is associated with an inventory item and captured by a user mobile device;
   associating, by the smart inventory service provider computing system, the inventory item data with a user account in a user inventory database;
   associating, by the smart inventory service provider computing system, the inventory item with a physical storage location of the inventory item;
   monitoring, by the smart inventory service provider computing system, a frequency of usage of the inventory item based on data supplied by a third party computing system;
   transmit, by the smart inventory service provider computing system, a message to the user mobile device based on the frequency of usage of the inventory item;
   monitoring, by the smart inventory service provider computing system, an external computing system for a first transaction offer related to the inventory item;
   upon receiving the first transaction offer from the external computing system, transmitting, by the smart inventory service provider computing system, the first transaction offer to the user mobile device;

receiving, by the smart inventory service provider computing system, a selection of a value change threshold amount associated with the first transaction offer for the inventory item from the user mobile device;

monitoring, by the smart inventory service provider computing system, the external computing system to estimate a real-time value of the inventory item;

determining, by the smart inventory service provider computing system, that the estimated real-time value of the inventory item has changed by a value change amount that exceeds the value change threshold amount; and upon determining that the estimated real-time value of the inventory item has changed by the value change amount that exceeds the value change threshold amount, transmitting, by the smart inventory service provider computing system, a second transaction offer to the user mobile device, wherein the second transaction offer is at least one of an offer to sell the inventory item, an offer to trade the inventory item, and an offer to donate the inventory item.

9. The computer-implemented method of claim 8, wherein the inventory item data is at least one of an item category, an item manufacturer, an item color, an item size, an item picture, and an item serial number.

10. The computer-implemented method of claim 8, wherein the inventory item is at least one of an appliances, a piece of furniture, an item of clothing, an electronic device, a book, a CD, a DVD, a Blu-Ray disc, a piece of sporting equipment, a musical instrument, a tool, and a toy.

11. The computer-implemented method of claim 8, wherein the external computing system is at least one of a marketplace computing system, a charity computing system, an item manufacturer computing system, and an insurance provider computing system.

12. The computer-implemented method of claim 8, wherein the method further includes associating the inventory item data with a receipt stored in the user account.

13. The computer-implemented method of claim 8, wherein the user mobile device is a mobile phone.

14. The computer-implemented method of claim 8, wherein the method further includes:

receiving, by the smart inventory service provider computer system, a transaction acceptance from the user mobile device; and associating, by the smart inventory service provider computer system, the second transaction offer with the inventory item data in a transaction database.

15. A computer-implemented method comprising:

capturing, by a smart inventory client application of a user mobile device, inventory item data, wherein the inventory item data is associated with an inventory item and the inventory item is associated with a physical storage location of the inventory item;

transmitting, by the smart inventory client application of the user mobile device, the inventory item data to a smart inventory service provider computing system;

receiving, by the smart inventory client application of the user mobile device, a message based on a frequency of usage of the inventory item from the smart inventory service provider computing system;

monitoring, by the smart inventory service provider computing system, an external computing system for a first transaction offer related to the inventory item;

receiving, by the smart inventory client application of the user mobile device, the first transaction offer related to the inventory item from the smart inventory service provider computing system;

transmitting, by the smart inventory client application of the user mobile device, a selection of a value change threshold amount associated with the first transaction offer for the inventory item to the smart inventory service provider computing system;

monitoring, by the smart inventory service provider computing system, the external computing system to estimate a real-time value of the inventory item;

determining, by the smart inventory service provider computing system, that the estimated real-time value of the inventory item has changed by a value change amount that exceeds the value change threshold amount;

upon determining, by the smart inventory service provider computing system, that the estimated real-time value of the inventory item has changed by the value change amount that exceeds the value change threshold amount, receiving, by the smart inventory client application of the user mobile device, a second transaction offer from the smart inventory service provider computing system; and transmitting, by the smart inventory client application of the user mobile device, a transaction offer acceptance to the smart inventory service provider computing system, wherein the second transaction offer is at least one of an offer to sell the inventory item, an offer to trade the inventory item, and an offer to donate the inventory item.

16. The computer-implemented method of claim 15, wherein the inventory item data is at least one of an item category, an item manufacturer, an item color, an item size, an item picture, and an item serial number.

17. The computer-implemented method of claim 15, wherein the inventory item is at least one of an appliances, a piece of furniture, an item of clothing, an electronic device, a book, a CD, a DVD, a Blu-Ray disc, a piece of sporting equipment, a musical instrument, a tool, and a toy.

* * * * *